Oct. 21, 1969  W. G. WHITE  3,473,233

METHOD FOR BALANCING COMPASS CARDS

Filed Sept. 12, 1966

United States Patent Office 3,473,233
Patented Oct. 21, 1969

3,473,233
METHOD FOR BALANCING COMPASS CARDS
Wilfrid Gordon White, Yarmouth, Maine, assignor to Maximum Inc., Nashua, N.H., a corporation of New Hampshire
Filed Sept. 12, 1966, Ser. No. 578,718
Int. Cl. G01c 17/08, 17/38, 25/00
U.S. Cl. 33—223                                   8 Claims

ABSTRACT OF THE DISCLOSURE

A series of readily severable bosses are provided around the rim of a compass card. A clip exactly equal and opposite to a boss in weighting or buoying effect on the card when the latter is immersed in the compass fluid is attached at that point around the rim where it is observed that the clip is needed for balancing the immersed card. As many clips are added as necessary. Then each clip is removed and also the counteracting boss nearest to it.

---

This invention relates to a method of balancing compass cards.

It is an object of this invention to provide a simple and speedy method of balancing compass cards resulting in very accurate balancing of the cards without the use of precision tools or precise procedures.

The invention features the method of balancing a compass card including the steps of constructing a compass card with a plurality of bosses disposed about it, then pivotally supporting the card at its center point in a liquid. Next, a mass, having a buoyant force equal and opposite to that of one of the bosses in the liquid, is placed on the card at a boss nearest a point of the card most vertically displaced from the horizontal plane. The mass is then removed and the boss nearest the mass is severed from the card.

The invention utilizes a compass card, for use in a damping liquid in a compass, having a plurality of bosses connected to it. The bosses have a significant buoyant force, and, when severed from the card nearest the point of the card most vertically displaced from the horizontal plane, they render a significant change in the buoyant force of the card tending to restore it to a level, horizontal position.

Other objects, features, and advantages will appear from the following description of the invention, taken together with the attached drawings thereof, in which.

Figure 1:
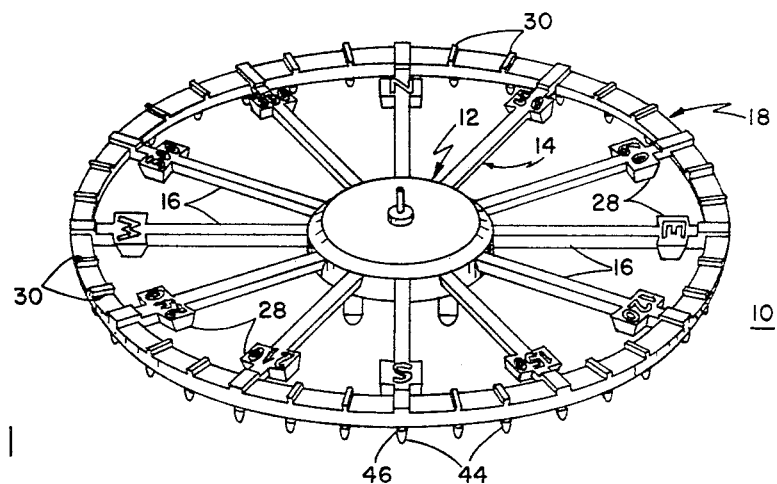
FIG. 1 is a perspective view of a card having bosses in accordance with the method of this invention.

Referring to FIG. 1 there is shown a polyethylene skeletal compass card 10 having a central section 12, intermediate section 14 composed of struts 16, and a peripheral section 18.

Central section 12 contains an annular flotation chamber 20 and a central, vertical bore 22 which holds pivot pin 24. Suspended from section 12 in brackets 25 are bar magnets 26. Cross-seats 28 on each of struts 16 carry the directional indicia 30, 60, 120, 150, 210, 240, 300, 330, N, E, W, and S. The segment of section 18 between each pair of struts 16 is divided into 10° portions by raised indicia 30.

Figure 3:
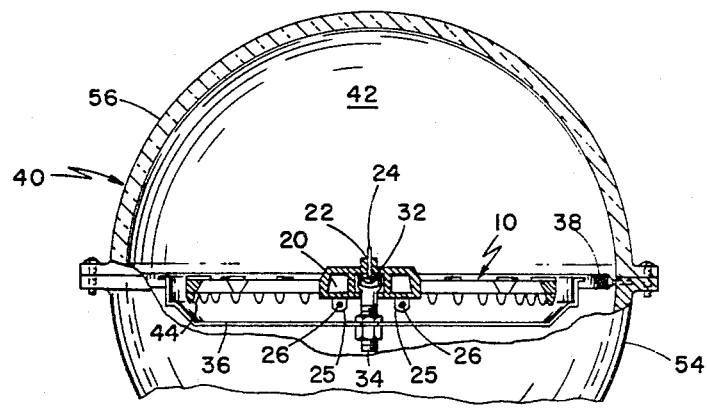
FIG. 3 is a portion of a compass with parts broken away showing the placement of the compass card of FIG. 1.

Card 10 is supported by pin 24 on jewel bearing 32 in post 34, FIG. 3, which is mounted on cardanically supported member 36. Member 36 is mounted to gimbal ring 38 for rotation about a diameter of said ring. Gimbal ring 38 is mounted to compass housing 40 for rotation about one of its own diameters. The housing is filled with kerosene 42 having a specific gravity between 0.96 and 0.98. Polyethylene has a specific gravity of 0.91.

Attached to the underside of section 18 are 36 bosses 44; there is a boss beneath each indicium at 10° increments. A circular groove 46 surrounds each boss at its upper portion and insures that each boss when removed will subtract the same volume from the card 10. The entire combination of card 10 and bosses 44 is homogenous and is integrally formed by the process of injection molding.

Figure 2:
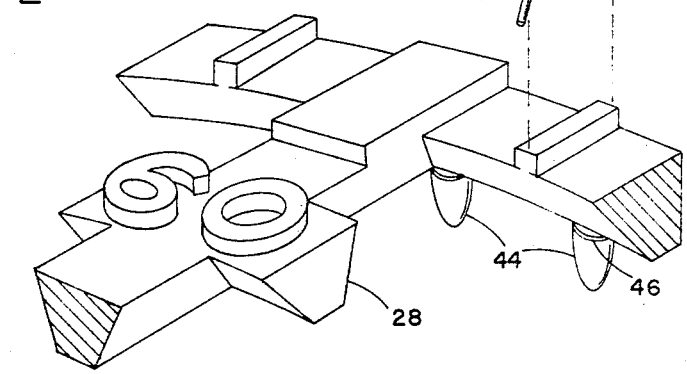
FIG. 2 is an enlarged view of a section of the card of FIG. 1, showing a clip used in the balancing of the card.

A number of clips 48, FIG. 2, are provided for balancing card 10. Each clip is constructed to have a weight when immersed equal to the net buoyant force of the polyethylene boss submerged in the kerosene 42 and has spaced legs 50 suspended from a straight segment 52, which enables it to be slipped over section 18 or struts 16.

After card 10 is constructed with the bosses it is pivotally supported in kerosene in the same manner as it is in compass housing 40, FIG. 3. The balancing may be done in the base 54 of housing 40 filled with kerosene 42 with the cover 50 removed. When the card 10 is stabilized one clip, more if necessary, is placed on the card over a boss nearest a point on the card that is riding highest in the kerosene. When the card assumes a horizontal position a boss, or number of bosses, equal to the number of clips used to balance the card, are severed from the card, the bosses severed being those closest to the aforementioned highest point of the card.

The invention is not limited to skeletal cards as shown in this embodiment, the card may be more or less open, completely solid or of any other form. The sections of the card need not be integrally formed nor need they be homogeneous; similarly the bosses and the card need not be integral or homogeneous. Although this embodiment uses a card and bosses having positive buoyancy and clips having negative buoyancy, the inventive concept applies equally as well to a card and bosses having negative buoyancy and clips having positive buoyancy. In the latter embodiment the clips would be added to, and the bosses severed from, the low side of the card. It should also be appreciated that the card and bosses may be made having opposite buoyancies.

What is claimed is:

1. The method of balancing a compass card comprising the steps of:
    constructing a compass card with a plurality of bosses disposed about said card,
    pivotally supporting said card at its center point in a liquid,
    placing a mass, having a buoyant force equal and opposite to that of a boss in said liquid, on said card at a boss nearest the point of said card most vertically displaced from the horizontal plane, and
    removing said mass and severing said boss nearest said vertically displaced point of said card.

2. The method of claim 1 in which all said bosses are located at the same radial distance from the center point of said card.

3. The method of claim 1 in which said bosses are located equally spaced about the circumference of a circle having its center at said center point.

4. The method of claim 1 in which said bosses are formed integrally with said card.

5. The method of claim 1 in which said bosses are formed of material which is less dense than said liquid and said mass is more dense than said liquid, said mass being added to, and said bosses being severed from, the elevated portion of said card.

6. The method of claim 1 in which said bosses are formed of a material which is more dense than said liquid and said mass is less dense than said liquid, said mass being added to, and said bosses being severed from, the depressed portion of said card.

7. The method of claim 5 in which said bosses and said card are made of homogeneous material and removal of one of said bosses subtracts from the buoyant force of said card.

8. The method of claim 6 in which said bosses and said card are made of homogeneous material, and removal of one of said bosses adds to the buoyant force of said card.

References Cited

UNITED STATES PATENTS

| 1,341,296 | 5/1920 | Campbell et al. | 33—223 |
| 1,902,497 | 3/1933 | Green | 33—223 |
| 2,300,685 | 11/1942 | McKay | 33—223 |

FOREIGN PATENTS 127,623  3/1950  Sweden.

ROBERT B. HULL, Primary Examiner

U.S. Cl. X.R.

73—1